United States Patent
Sheffield et al.

(10) Patent No.: US 10,235,797 B1
(45) Date of Patent: Mar. 19, 2019

(54) INVERSE RENDERING OF VISUAL MATERIAL PROPERTIES

(71) Applicant: Lowe's Companies, Inc., Mooresville, NC (US)

(72) Inventors: Mason E. Sheffield, Woodinville, WA (US); Oleg Alexander, Bothell, WA (US)

(73) Assignee: LOWE'S COMPANIES, INC., Mooresville, NC (US)

( * ) Notice: Subject to any disclaimer, the term of this patent is extended or adjusted under 35 U.S.C. 154(b) by 0 days.

(21) Appl. No.: 15/823,055

(22) Filed: Nov. 27, 2017

(51) Int. Cl.
G06T 15/50 (2011.01)
G06T 7/00 (2017.01)
G06T 15/20 (2011.01)
G06T 19/00 (2011.01)
G06T 7/11 (2017.01)
G06K 9/00 (2006.01)

(52) U.S. Cl.
CPC .......... *G06T 15/506* (2013.01); *G06T 7/0002* (2013.01); *G06T 7/11* (2017.01); *G06T 15/205* (2013.01); *G06T 19/006* (2013.01); *G06K 9/00248* (2013.01); *G06T 15/50* (2013.01); *G06T 2200/04* (2013.01)

(58) Field of Classification Search
CPC ...... H04N 13/0239; G06T 2207/30201; G06T 7/74; G06T 11/00; G06K 9/00248; G06K 9/00234
See application file for complete search history.

(56) References Cited

U.S. PATENT DOCUMENTS

| | | | |
|---|---|---|---|
| 7,551,760 B2 | 6/2009 | Scharlack et al. |
| 8,345,252 B2 | 1/2013 | Nisper et al. |
| 8,525,846 B1 | 9/2013 | Hickman et al. |
| 8,953,037 B2 | 2/2015 | Wang et al. |
| 9,074,986 B2 | 7/2015 | Pal et al. |
| 9,157,855 B2 | 10/2015 | Tin et al. |

(Continued)

FOREIGN PATENT DOCUMENTS

| | | |
|---|---|---|
| CN | 104765915 | 7/2015 |
| DE | 4229349 | 5/1995 |

OTHER PUBLICATIONS

Sairiala "PBR workflows for realistic rendering in Cycles Render Engine" thesis at Tampere University of Applied Sciences, Degree programme in Media, 2015.*

(Continued)

*Primary Examiner* — Saptarshi Mazumder
(74) *Attorney, Agent, or Firm* — Kilpatrick Townsend & Stockton LLP

(57) ABSTRACT

Techniques described herein are directed to a system and methods for generating 3D models of an object which accurately depict reflective properties of the object. To do this, an image of an object is captured and a rendered image of the object is generated from the image. The system then generates a lighting effect which approximates an effect of the actual light source on the appearance of the object when the image was captured. A number of rendered images of the object are generated using the lighting effect, each having different visual material property values. Once the rendered images have been generated, the system may compare the generated rendered images to the actual image in order to identify the rendered image which best approximates the actual image. The visual material property values associated with the best approximation are then assigned to the object.

22 Claims, 9 Drawing Sheets

(56) References Cited

U.S. PATENT DOCUMENTS

| | | | |
|---|---|---|---|
| 9,325,966 | B2 | 4/2016 | Tin |
| 9,367,909 | B2 | 6/2016 | Tin |
| 9,417,185 | B1 | 8/2016 | Bruce et al. |
| 9,509,905 | B2 | 11/2016 | Gordon et al. |
| 9,524,547 | B2 | 12/2016 | Graumann et al. |
| 9,613,300 | B2 | 4/2017 | Tin et al. |
| 2003/0137506 | A1* | 7/2003 | Efran .................. G06T 9/00 345/419 |
| 2005/0286799 | A1* | 12/2005 | Huang ................ G06T 11/00 382/275 |
| 2008/0273801 | A1* | 11/2008 | Podilchuk ......... G06K 9/3241 382/218 |
| 2010/0290032 | A1 | 11/2010 | Bugge |
| 2014/0118402 | A1* | 5/2014 | Gallo .................. G06T 5/50 345/646 |
| 2017/0054954 | A1 | 2/2017 | Keitler et al. |
| 2017/0109874 | A1 | 4/2017 | Hallasch et al. |
| 2017/0109931 | A1* | 4/2017 | Knorr ................ G06T 19/006 |

OTHER PUBLICATIONS

Dorsey et al., "Modeling and Rendering of Metallic Patinas", *ACM SIGGRAPH 2006 Courses* (2006), pp. 387-396.

Gupta et al., "Structured Light 3d Scanning in the Presence of Global Illumination",*IEEE Conference on Computer Vision and Pattern Recognition (CVPR)* (2011), 10 pages.

Liu et al., "Learning Discriminative Illumination and Filters for Raw Material Classification With Optimal Projections of Bidirectional Texture Functions", *Proceedings of the IEEE Conference on Computer Vision and Pattern Recognition* (2013), pp. 1430-1437.

Siewczyska , "Method for Determining the Parameters of Surface Roughness by Usage of a 3d Scanner", Archives of Civil and Mechanical Engineering, vol. 12, No. 1 (2012), pp. 83-89.

Wang et al., "Material Classification using BRDF Slices", *IEEE Conference on Computer Vision and Pattern Recognition (CVPR)* (2009), 7 pages.

\* cited by examiner

*FIG. 6*

INVERSE RENDERING OF VISUAL MATERIAL PROPERTIES

BACKGROUND

In a number of industries, three-dimensional (3D) models may be used to represent various objects. For example, any industry that uses or sells objects may need to understand how different objects interact or how they might appear together. The generation of such a 3D model may require that a system obtain an image of the surface of an object, which may be rendered or displayed as a two-dimensional image via 3D rendering or displayed as a three-dimensional image.

Various techniques exist for generating 3D models from objects. For example, a given object may be scanned from a number of different angles, and the scanned images can then be combined to generate the 3D image of the object. In another example, a 3D model may be created manually by an artist or drafter.

Often, when an object is being scanned, it is desirable to show near exact color and visual material properties to more accurately depict how the object looks in the real world. However, due to lighting and reflectiveness of a sample being scanned, some visual material properties, such as whether an item is metallic or has rough surfaces, can be hard to assess. For example, it is often difficult to assess visual material properties such as metalness or roughness. "Metalness" is a measure of how metallic something is. "Roughness" is a measure of how shiny or reflective something is. If something is very rough, it is not shiny at all. If something is not rough at all, then it has very sharp highlights (e.g., shiny).

In some conventional systems, default visual material properties are applied to every object, resulting in generated 3D models that look equally shiny. The resulting 3D models lack realism. In some other conventional systems, an artist may estimate various visual material properties for an object based on the captured image. However, this often results in inconsistencies and is error-prone in general. Some conventional systems may use a device, such as a Gonioreflectometer, which directly captures the bidirectional reflectance (BRDF) of a material per pixel. Devices such as this take thousands of images of an object from every possible camera angle, and from every possible lighting direction. However, capturing the number of images of an object required by the device can be inefficient, time-consuming, and costly.

Embodiments of the invention address these and other problems, individually and collectively.

SUMMARY

Techniques described herein are directed to a system and methods for generating a 3D model of an object which is accurately depicted with respect to visual material properties. In some embodiments, a number of images of an object are captured in order to generate a rendered image of the object. In some embodiments, the system may do this by generating a virtual light source which approximates (or simulates) an actual light source with which the images were captured. The virtual light source may then be used to generate a number of rendered images of the object, each having different visual material property values. Once generated, the system may compare the generated rendered images to the actual image in order to identify the rendered image which best approximates (or simulates) the actual image. The approximation may be calculated as a delta or image error. Once the lowest image error has been identified for the rendered images, the visual material property values associated with the rendered image having the lowest image error are assigned to the object. In some embodiments, the assigned visual material property values may be refined by repeating the process using a smaller range of visual material property values. In these embodiments, the smaller range of visual material property values may be set to include the assigned visual material property values.

One embodiment of the disclosure is directed to a method of generating a three-dimensional (3D) model, comprising receiving a captured image of an object using a light source, identifying a section of the object based on the captured image, simulating a lighting effect that approximates an effect of the light source on the appearance of the object. The method further comprises for the at least a first section of the object, performing operations that comprise: generating a grid of rendered images, using the simulated lighting effect, with each rendered image having a specified visual material property value according to a position within the grid of rendered images, comparing an individual rendered image in the grid of rendered images to the captured image, calculating an image error based on the comparison between the individual rendered image and the captured image, and assigning a visual material property value associated with the individual rendered image to the section based upon the image error.

Another embodiment of the disclosure is directed to a 3D imaging system comprising one or more camera devices, a processor, and a memory including instructions that, when executed with the processor, cause the system to, at least: generate a lighting effect that approximates (or simulates) an effect of a light source, receive one or more captured images of an object illuminated by the light source, receive user information regarding one or more operational constraints, generate a grid of rendered images, using the generated lighting effect, with each rendered image having a specified visual material property value according to a position within the grid, compare at least one rendered image in the grid to the one or more captured images, calculate, based on the comparison between each rendered image in the grid and the one or more captured images, an image error, identify a rendered image of the grid of rendered images associated with a minimum image error, and assign at least one visual material property value associated with the identified rendered image to the first section.

Yet another embodiment of the disclosure is directed to a 3D imaging apparatus comprising one or more optical sensors configured to capture an image of an object, a light source, and a control unit communicatively coupled to the one or more optical sensors, the control unit configured to: receive one or more captured images of an object illuminated by the light source, generate a lighting effect that approximates (or simulates) an effect of the light source on the appearance of the object; generate a grid of rendered images, using the generated lighting effect, with each rendered image having a specified visual material property value according to a position within the grid, compare at least one rendered image in the grid to the one or more captured images, calculate, based on the comparison between each rendered image in the grid and the one or more captured images, an image error, identify a rendered image of the grid of rendered images associated with an image error, and assign at least one visual material property value associated with the identified rendered image to the first section.

BRIEF DESCRIPTION OF THE DRAWINGS

Various embodiments in accordance with the present disclosure will be described with reference to the drawings, in which:

FIG. 6 depicts an illustrative example of a grid of rendered images that may be generated in accordance with at least some embodiments;

DETAILED DESCRIPTION

Figure 1:
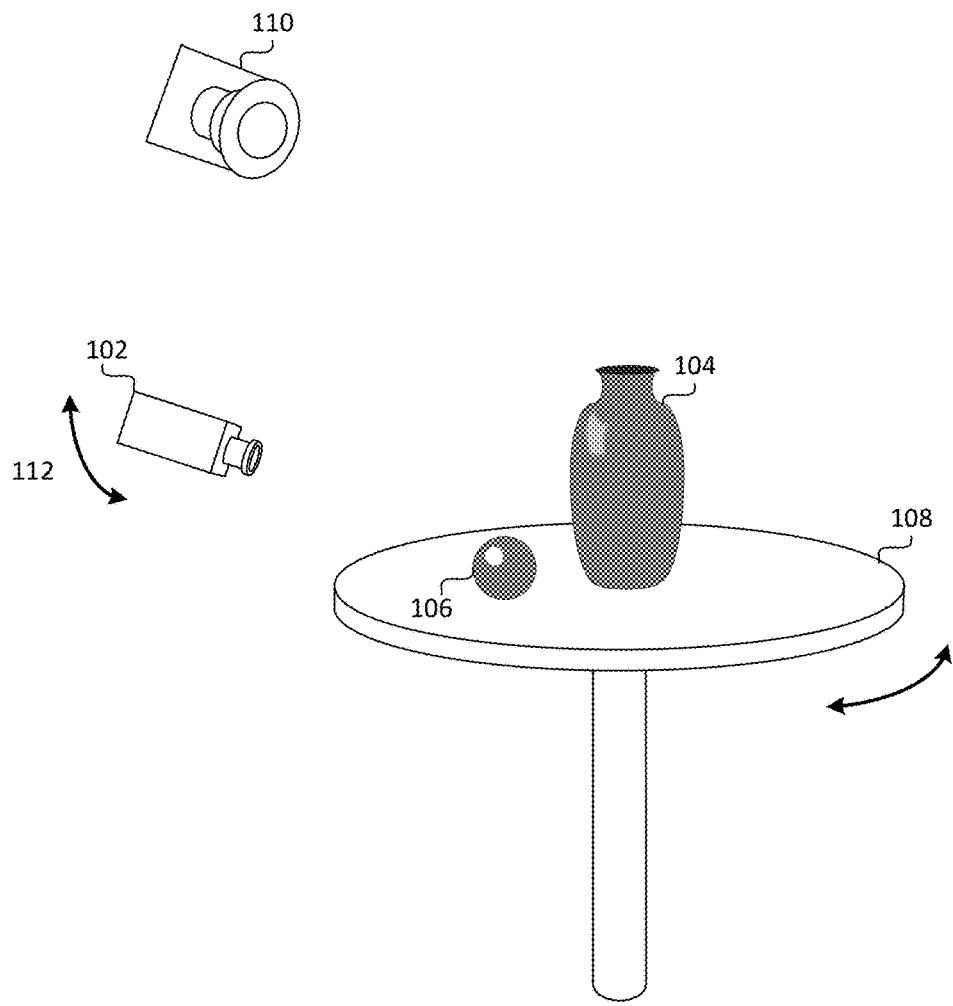
FIG. 1 depicts an illustrative example of a 3D imaging system that may be implemented in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to a three-dimensional (3D) imaging system configured to generate a 3D model of an object using inverse rendering of material properties. The imaging system may iterate through a number of sections of an object when generating a 3D model of the object. In some embodiments, a range of material properties may be pre-defined and stored in the imaging system. Once an appropriate range of material properties is selected, the generation of the 3D model may occur in accordance with this range information. For example, the imaging system may store an upper bound and/or lower bound information for specular values associated with different types of materials. Upon detecting that a section of an object likely consists of a material type, the imaging system may retrieve and apply the upper and/or lower bound values of the material properties.

In some embodiments, the 3D imaging system may include a turntable, where an object may be staged and rotated. In these embodiments, the object may be rotated and photos may be taken from multiple different angles. In other embodiments, a full array of cameras can be used without a turntable. The difference between a turntable system and a full array is that a turntable simulates the presence of hundreds of cameras, whereas a full array may literally be composed of hundreds of cameras. In a full array system, there is no turntable, and cameras are typically arranged facing inward to scan the object in the center. One reason a person might want to use a full array system as opposed to a turntable system is to scan objects that have a tendency to move during scanning (e.g., people). A full array permits scanning of such an object almost instantaneously, avoiding issues with movement of the object. As used herein, an imaging system is any system capable of capturing image information for an object in order to generate a 3D model, with or without a turntable.

Physically Based Rendering (PBR) is the process in which a 3D model renderer seeks to render graphics to more accurately model the flow of light in the real world. Often, PBR is directed to the accurate or realistic representation of visual material properties for an object. Visual material properties may include any property which affects the appearance of an object, such as intensity, gloss, metallicity (also referred to as metalness), roughness (e.g., a visual effect resulting from microsurfaces), or any other suitable visual property of a material.

In some embodiments, visual material properties may be specific to a particular shading model. For example, different shading models may use different visual material properties when rendering 3D models. It should be noted that the techniques described herein may be applicable using any suitable visual material properties, and not just those illustratively used herein.

FIG. 1 depicts an illustrative example of a 3D imaging system that may be implemented in accordance with at least some embodiments. In FIG. 1, one or more camera devices 102 may be configured to obtain a set of images of an object 104. In some embodiments, the 3D imaging system may also include a staging object 106 placed within a scene associated with the object 104. The object 104 may be positioned on a staging platform 108. A light source 110 may illuminate the object 104 and the surrounding area.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communication protocol.

In some embodiments, the 3D imaging system may include one or more camera devices 102 configured to capture one or more images of the object 104. In some embodiments, the one or more camera devices 102 may include an array of camera devices. In these embodiments, each camera device in the array of camera devices may be configured to capture an image of a different section of a surface of the object 104. In some embodiments, the one or more camera devices 102 may consist of a single camera device. The camera devices 102 may each be capable of exhibiting a range of movement 112.

In some embodiments, the object 104 may include a number of separate sections or regions. Different sections of an object 104 may be identified to correspond to differences in materials for those respective sections. For example, an object 104 may be made up of a metallic section and a plastic section. In this example, each of the metallic and plastic sections would be identified as separate sections of the object 104. To identify various sections of the object 104, the 3D imaging system may identify variances in material properties of the object 104 over its surface. For example, a material's appearance may change over its surface as a result of a change in color, texture, roughness, or metalness values. Thus, separate sections of the object 104 may be identified as being associated with different materials because those separate sections have different specular values (e.g., roughness, or metalness values). An object 104 may include any number of sections with any number of different types of materials. For example, a television remote control may have two sections, which consist of two different types of materials: one for the body of the remote, and another for the buttons of the remote control. In some embodiments, the 3D imaging system may begin one or more of the techniques described herein by identifying a number of sections of the object.

In some embodiments, the 3D imaging system may use a staging object 106 to approximate (or simulate) an effect of the existing light source 110. A staging object 106 may be any object having a known geometry and specular values. For example, the staging object 106 may be a chrome ball which has a maximum metalness value and a minimal roughness value. The staging object 106 may be used to approximate (or simulate) a position and intensity of the light source 110 relative to the scene. For example, the 3D imaging system may calculate the position of the light source 110 based on a position of a highlight 114 identified on the staging object 106, which may indicate an angle of reflection. Based on the determined position of the light source 110, the 3D imaging system may approximate (or simulate) a lighting effect to be used in the techniques described herein. In some embodiments, the light source 110 may be in a known location and have a known intensity. In these embodiments, it may be unnecessary for the 3D imaging system to include a staging object 106.

In some embodiments, the object 104 may be placed on a staging platform 108. The staging platform 108 may be capable of being rotated or otherwise moved. For example, the staging platform 108 may be fitted with a motor or other actuator to be used in angular rotation of the platform. During the course of obtaining a set of images, a control unit (not shown) may cause the staging platform 108 to reposition the object a number of times so that sets of images may be taken of the object 104 at each position.

In accordance with some embodiments, the 3D imaging system illustrated in FIG. 1 may be used to accurately depict an object 104 using a virtual object having visual material properties approximate to (or simulative of) visual material properties of the object 104. In these embodiments, the 3D imaging system may generate a lighting effect (using a process described in greater detail below). The 3D imaging system may then identify a section of the object for which visual material properties are to be approximated (or simulated). Using the simulated lighting effect, the 3D imaging system may generate a grid of rendered images having predetermined visual material property values. The grid may include two or more dimensions, each of which represent mappings of visual material property combinations. Predetermined visual material property values may be maintained by the system or provided by a user. By way of illustration, a user may provide a range of values for a visual material property, such as metalness, as one operational constraint for the grid. In this illustration, the visual material property range provided for the grid may include a first visual material property range for "metalness" from 0 through 9 units. One advantage to picking a particular specular range is optimization, in that rather than create a grid for every possible range of units that a visual material property can consist of, the grid includes only those values of the visual material property likely to be relevant. A second visual material property, such as roughness, may be provided and the two visual material property value sets can be arranged in a grid representing all possible combinations of the two visual material properties (i.e., (1, 1), (1, 2), (1, 3) . . . (2, 1), (2, 2), (2, 3) . . . (9, 7), (9, 8), (9, 9)). In some embodiments, the constraints for the grid may be defined by a user. It should be noted that although increments are depicted in the above example as being in integers, the grid may include any suitable increments. The 3D imaging system may then generate a number of rendered images to fill the generated grid of rendered images. Each of the generated rendered images may be generated for its corresponding grid coordinates using the visual material properties assigned to those coordinates.

Once rendered images have been generated for each of the fields in the grid of rendered images, each of those images may be compared to an obtained actual image of the object 104. The 3D imaging system may then determine a delta between the actual image and each of the rendered images. In some embodiments, the delta may be represented as a level of error (e.g., a mean squared error) or the delta may be represented as an absolute difference. In some embodiments, these deltas may be maintained in a grid format in which each delta is stored so that it corresponds with its associated rendered image. Once the deltas have been identified for each of the rendered images, the 3D imaging system may identify the minimum delta from those determined. The 3D imaging system may then assign the visual material properties assigned to the associated rendered image to the section of the object.

The process described above may be repeated a number of times for each identified section of an object 104. For example, if the 3D imaging system determines that the object has three sections, then the 3D imaging system may generate a grid for each of the three sections using the same virtual light source to render a simulated lighting effect on each of the sections. The 3D imaging system may then assign visual material properties to each of the sections of the object 104 using the described process. In some embodiments, the visual material properties of a section may be refined by narrowing the range of visual material property values based on those identified in the above process and repeating the process using that narrower range of values.

In some embodiments, the one or more camera devices 102 may be configured to be rotated or moved. For example, the cameras may be positioned on moveable tracks or rails in order to cause a camera, a row of cameras, and/or a column of cameras to be repositioned in accordance with instructions provided by a control unit. In some embodiments, one or more cameras may be installed on a mechanical arm assembly. In some embodiments, each of the one or more camera devices 102 may be configured such that a level of pan or tilt for that camera may be adjusted.

Figure 2:
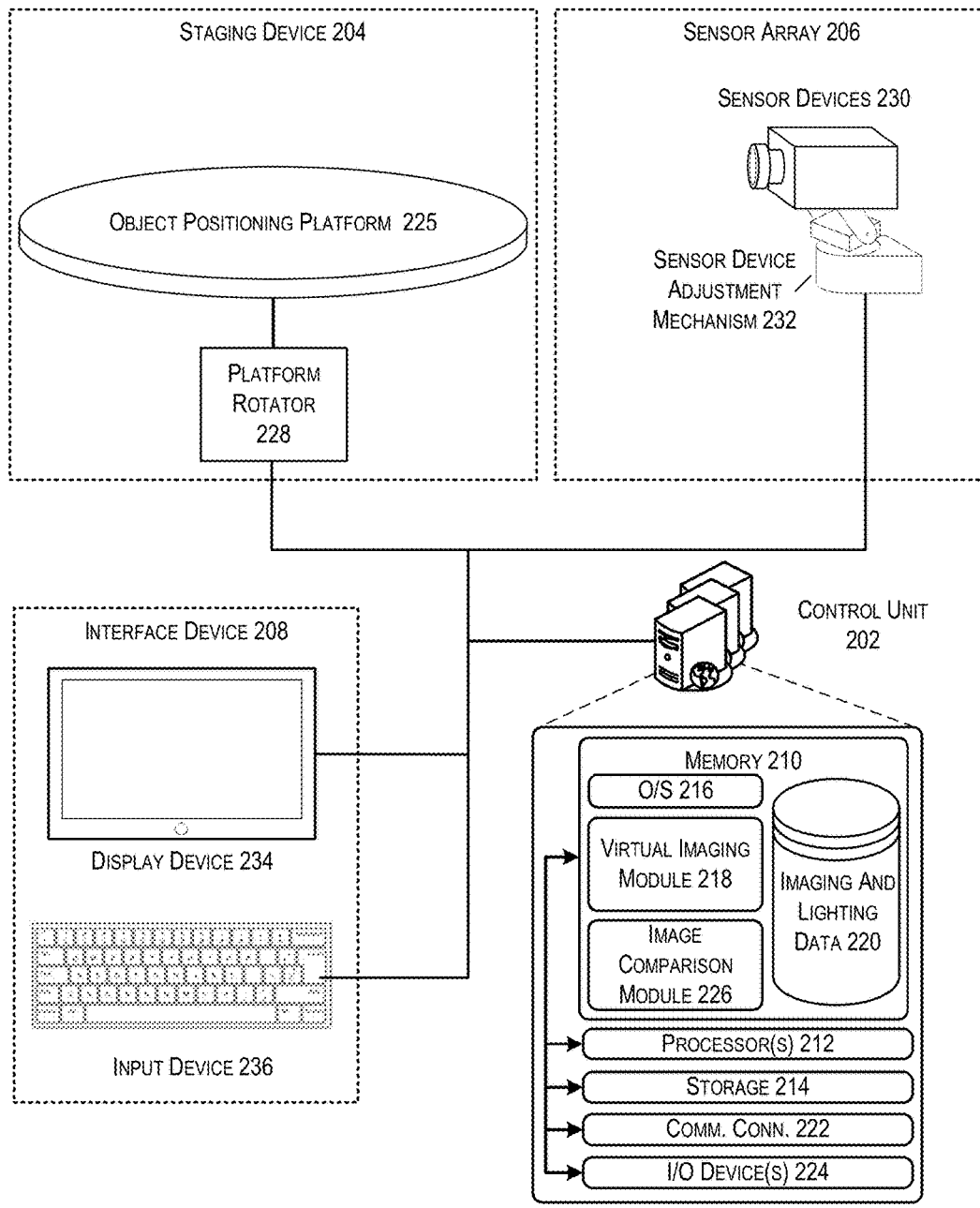
FIG. 2 depicts a system architecture for a 3D imaging system that may be configured to generate a 3D model of an object using inverse rendering of visual material properties in accordance with at least some embodiments.

FIG. 2 depicts a system architecture for a 3D imaging system that may be configured to generate a 3D model of an object using inverse rendering of visual material properties in accordance with at least some embodiments. In FIG. 2, a control unit may be in communication with a number of other components, including at least a staging device 204, a sensor array 206, and an interface device 208.

The control unit 202 may be any type of computing device configured to capture 3D images from an object. In some embodiments, the control unit 202 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the control unit 202 may include at least one memory 210 and one or more processing units (or processor(s)) 212. The processor(s) 212 may be implemented as appropriate in hardware, computer-executable instructions, firmware or combinations thereof. Computer-executable instruction or firmware implementations of the processor(s) 212 may include computer-executable or machine executable instructions written in any suitable programming language to perform the various functions described.

The memory 210 may store program instructions that are loadable and executable on the processor(s) 212, as well as data generated during the execution of these programs. Depending on the configuration and type of control unit 202, the memory 210 may be volatile (such as random access memory (RAM)) and/or non-volatile (such as read-only memory (ROM), flash memory, etc.). The control unit 202 may also include additional storage 214, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 210 may include multiple different types of memory, such as static random access memory (SRAM), dynamic random access memory (DRAM) or ROM. Turning to the contents of the memory 210 in more detail, the memory 210 may include an operating system 216 and one or more application programs or services for implementing the features disclosed herein including at least a module for generating rendered images of an object or section of an object (virtual imaging module 218) and/or a module for comparing rendered images to an actual image to determine visual material properties of the actual image (image comparison module 226). The memory 210 may also include imaging and lighting data 220, which provides information used by the 3D imaging system. In some embodiments, the imaging and lighting data 220 may be stored in a database.

The memory 210 and the additional storage 214, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are installed on and/or executed from the control unit 202. The control unit 202 may also contain communications connection(s) 222 that allow the control unit 202 to communicate with a stored database, another computing device or server, user terminals, and/or other components of the imaging system. The control unit 202 may also include input/output (I/O) device(s) and/or ports 224, such as for enabling connection with a keyboard, a mouse, a pen, a voice input device, a touch input device, a display, speakers, a printer, etc.

Turning to the contents of the memory 210 in more detail, the memory 210 may include an operating system 216, a database containing imaging and lighting data 220 and the one or more application programs or services for implementing the features disclosed herein, including a virtual imaging module 218 and an image comparison module 226.

In some embodiments, the virtual imaging module 218 may be configured to, in conjunction with the processors 212, generate a virtual light source using information obtained from an image and generate a number of rendered images of an object, each with predetermined visual material properties using the virtual light source. In accordance with at least some embodiments, the virtual imaging module 218 may identify lighting information in an image by measuring the light that appears on a staging object, such as a chrome (or mirrored) ball. Based on this information, the virtual imaging module 218 may identify a location, color, and intensity of a light source. The virtual imaging module 218 may then generate a lighting effect that approximates (or simulates) an effect of the detected light from the light source. In this way, light reflected off of the staging object may be detected and used by the virtual imaging module 218 to generate a virtual approximation (or simulation) of an effect of the actual light source.

Once a virtual light source has been generated to approximate the actual light source, the virtual imaging module 218 may generate a number of rendered images using that simulated lighting effect. In some embodiments, the rendered images may be arranged in, or associated with, grid coordinates. In these embodiments, the columns and rows of the grid may represent particular visual material property values such that the rendered image associated with a particular data field is generated using those visual material property values. When generating the rendered images, the virtual imaging module 218 estimates (or determines) a location of a highlight for the section of the object within the rendered image based on the geometry and pose (location and orientation) of the section of the object as well as the position of the virtual light source. A highlight may be an example of a lighting effect that may be simulated using techniques described herein. The virtual imaging module 218 may then generate a highlight in the estimated (or determined) location using the visual material properties assigned to a grid coordinate.

In some embodiments, the image comparison module 226 may be configured to, in conjunction with the processors 212, compare each rendered image in a grid of rendered images to an actual image of an object, calculate a delta between each of the rendered images in the grid and the actual image, and approximate (or simulate) visual material properties for an object by identifying a minimum delta. In some embodiments, the image comparison module 226 may compare only a segment of the rendered image in which a highlight is estimated (or determined) to exist to a corresponding segment in the actual image. In some embodiments, the image comparison module 226 may determine (e.g., based on a number of relatively high deltas), that a highlight on the generated rendered image has been placed in the wrong location. The image comparison module 226 may then identify a correct location for the highlight and may call an instance of the virtual imaging module 218 to regenerate the grid of rendered images using the corrected highlight location. Comparison of a rendered image to an actual image may be performed in a number of ways. In some embodiments, the image comparison module 226 may make a pixel-by-pixel comparison in which pixel values (e.g., red, green, and blue values) are compared for each corresponding pixel in the two images. A delta may then be calculated as a function of the difference in values identified. In some embodiments, the delta may be represented by an absolute difference or mean-squared error. In some embodiments, deltas may be calculated and stored in relation to each of the rendered images in the grid of rendered images. In at least some of these embodiments, these deltas may be stored in a grid of deltas.

In some embodiments, a staging device 204 may be any device or structure configured to manipulate a position of an item for the purpose of obtaining image information. Staging platform 106 described in FIG. 1 may be an example staging device 204. In some embodiments, the staging device 204 may include an object positioning platform 225 and a platform rotator 228. The object positioning platform 225 may be a rotatable platform upon which one or more items can be placed for imaging of the items using the sensor array 206. In some embodiments, the rotatable platform may be configured to be rotated by the platform rotator 228 in order to reposition the item on the platform. The platform rotator 228 may be a motor configured to, upon receiving instructions from the control unit 202, activate and cause the object positioning platform to rotate.

In some embodiments, the sensor array 206 may include a number of sensor devices 230 and one or more sensor device adjustment mechanisms 232. The sensor devices 230 may include a number of camera devices, one or more of which may be a range camera device (e.g., a depth sensor) capable of generating a range image, and a number of which may be cameras configured to capture image information. The one or more camera devices 102 depicted in FIG. 1 are an example of a sensor array 206 that may be implemented. In some embodiments, the sensor array 206 may include a number of camera devices arranged in an array or matrix (e.g., in rows and columns). Each of the camera devices in the array of camera devices may be positioned (e.g., having a tilt and position) to capture image information with respect to a particular respective field of view. In some embodiments, each of the camera devices may be configured to be repositioned in order to alter that camera device's tilt, pan, and/or level of magnification to capture an image of a specified field of view.

The sensor device adjustment mechanism 232 may be any mechanism having means for adjusting a pan, tilt, and/or position of one or more sensor devices. In some embodiments, the sensor device adjustment mechanism 232 may be a mechanical or robotic arm. In some embodiments, the one or more sensor devices may be arranged on a track or rail, in which case the sensor device adjustment mechanism 232 may include a means for moving the sensor device along the track or rail. In some embodiments, the one or more sensor devices may be arranged on a tripod or pole, in which case the sensor device adjustment mechanism 232 may include a means for providing angular rotation for the sensor devices. One skilled in the art, after considering the teachings of this disclosure, would easily recognize a number of sensor device adjustment mechanisms that may be employed with the disclosed system.

In some embodiments, the 3D imaging system may include an interface device 208. An interface device may include any combination of display device 234 and/or input device 236. In some embodiments, each of the display device 234 and the input device 236 may be separate devices which are communicatively coupled. The display device 234 may include any means for presenting information to a user or users. In some embodiments, the display device 234 may include outputs for audio presentation of data. In some embodiments, the display device 234 may be wearable. For example, the display device 234 may be a virtual reality (VR) or augmented reality (AR) headset.

The input devices 236 may be any device configured to receive input from a user and convert that input into machine executable instructions. In some embodiments, the input devices 236 may include mouse, keyboards, joysticks, or any other suitable means of receiving user input. In some embodiments, the interface device 208 may be used, in conjunction with the control unit 202, to manipulate the sensor array 206 and/or components of the staging device 204.

Figure 3:
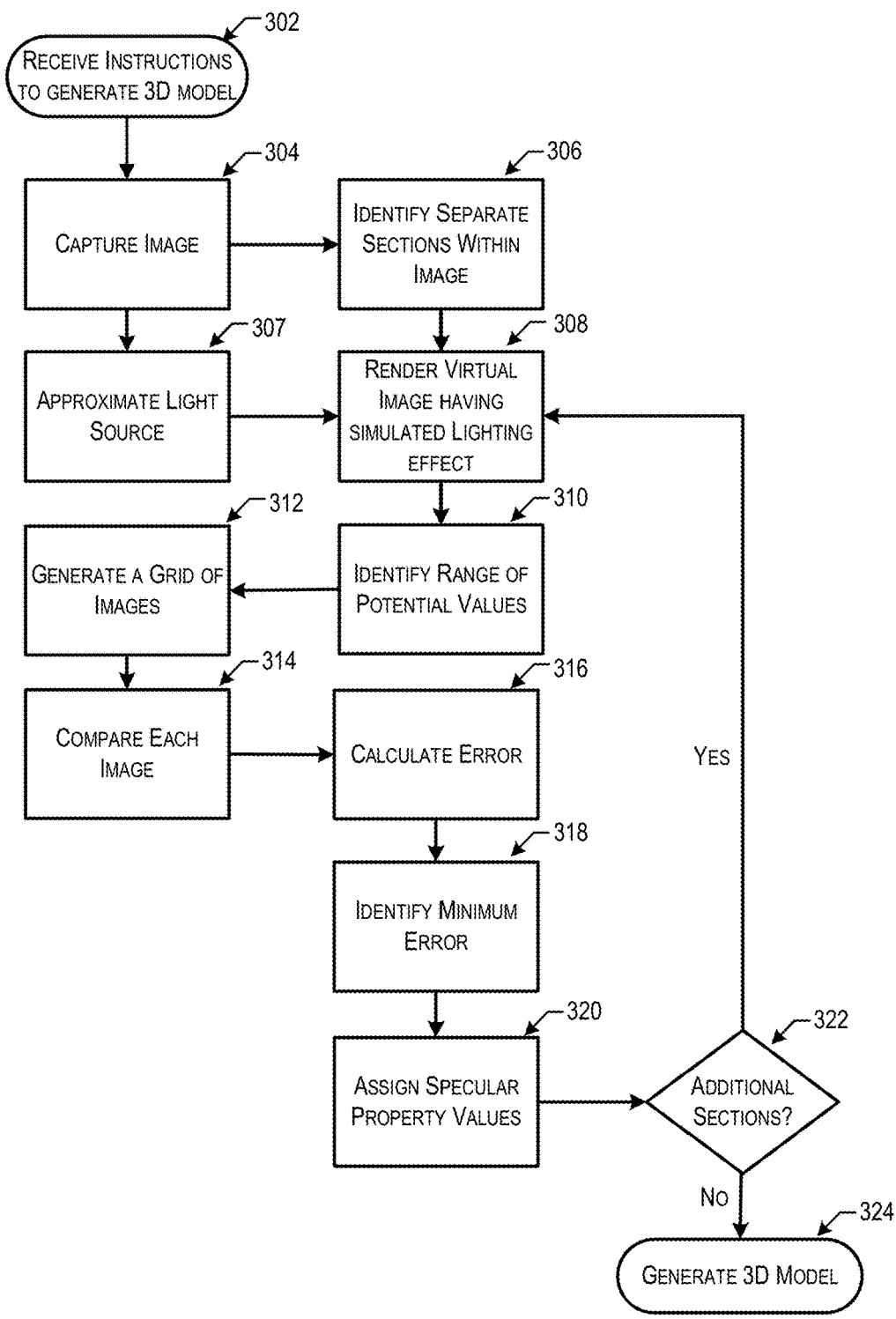
FIG. 3 depicts a flow chart illustrating a process that utilizes inverse rendering of material in accordance with at least some embodiments.

FIG. 3 depicts a flow chart illustrating a process for generating a 3D model using inverse rendering of visual material properties in accordance with at least some embodiments. Some or all of the process 300 (or any other processes described herein, or variations, and/or combinations thereof) may be performed under the control of a computer system configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the computer system that performs the process 300 may be a 3D imaging system that includes some or all of the components depicted in FIG. 2.

Process 300 may begin at 302, when a request is received by a computer system to generate a 3D image of an object. In some embodiments, the object may be positioned within a staging area (e.g., on an object positioning platform 225) in view of an array of camera devices. In some embodiments, the computer system may provide an interface (e.g., via the interface device 208 of FIG. 2), to the user. At the interface, a user may request to capture 3D imaging information for an object. In some embodiments, the request may include an indication of a material for an object and/or a range of visual material property values. For example, a user may identify two or more distinct materials for an object and/or a specific range of visual material properties that should be used in the process 300.

There may be a number of reasons for a user to provide a range of visual material property values. For example, a user may know a particular range for the given object that is likely a close match. In this same example, a user may select a particular range in order to achieve a greater efficiency of generating a 3D model. As can be envisioned, using a smaller visual material property range will result in achieving a greater level of efficiency in generating a 3D model. However, using a smaller visual material property range will also result in potential loss of accuracy (e.g., there may be a configuration of visual material properties that had a lower error than the limited range). Accordingly, a user may wish to configure a range of visual material property values based on whether greater accuracy is needed.

At 304, the computer system captures one or more images of an object (e.g., the object 104 depicted in FIG. 1). The system may capture the one or more images using the process shown in the flow diagram of FIG. 4. Several properties of the object may be identified during the imaging process. For example, the system may recognize the geometry of the object, the lighting condition, the diffuse/color texture of the object, and material properties of the object. In some embodiments, High Dynamic Range Imaging (HDRI)

techniques are employed. HDRI techniques allow for the capture of greater details and a dynamic range of luminosity for the object.

At 306, the computer system may identify separate sections within an object. In some embodiments, this may involve the identification of variances in properties of the object detected over its surface. In some embodiments, the computer system may provide an interface (e.g., via the interface device 208 of FIG. 2), to the user, which may enable the user to provide an indication of different sections of the object as well as potential materials for those sections. For example, in some embodiments, an indication may be received from a user that an object includes three sections that consist of a top section, a bottom section, and a middle section. In this example, the user may also indicate a type of material for each of the sections. In some embodiments, the 3D imaging system may identify each of the sections of the object automatically (e.g., without user interaction) by identifying variances in material properties. For example, the 3D imaging system may detect a change in coloring or a change in reflectance values for the object. In this example, the area associated with a first set of material properties may be associated with a first section of the object and an area associated with a second set of material properties may be associated with a second section of the object.

In some embodiments, the computer system may also use machine vision and/or one or more machine learning (ML) techniques to identify the separate sections of the object. For example, the computer system may identify, using ML, that the object is a hammer. In this example, the computer system may determine that a hammer typically includes a head section and a shaft section. The computer system may also determine that the head section is typically made of a metallic material and the shaft section is typically made of a wood or plastic material. In some embodiments, the staging area in which the object is located may be marked with one or more identifiers or patterns that may be used, when captured within image information, to identify different sections of an object. For example, the computer system may attempt to locate one or more markers within an image captured of the object and, upon detecting the one or more markers, may determine separate sections of the object based on the location of features of the object in relation to the markers.

At 307, the computer system may obtain information about an actual light source based on lighting conditions detected in a captured image in order to approximate (or simulate) the light source. In some embodiments, the computer system may detect a staging object within the image that includes a known geometry and/or visual material property values. From the location and intensity of a highlight resulting from a reflection of the actual light source on the staging object, the computer system may determine one or more properties of the light source. For example, the system may determine an approximate (or exact) location of the light source, an intensity of the light source, a wavelength (or color) or the light source, or any other suitable information related to the light source. In some embodiments, the light source properties (such as the location and/or intensity of the light source) may be known by the computer system. For example, the light source may be in a set position relative to the object and/or staging platform.

In some embodiments, the system may generate a virtual light source which approximates the determined properties of the actual light source (e.g., located at the same position in space, having the same intensity, etc.). In these embodiments, the virtual light source may be used (e.g., in conjunction with ray tracing software) to generate a lighting effect that approximates (or simulates) an actual lighting effect on the object. However, it should be noted that this is merely one technique that may be used to approximate or simulate such a lighting effect. One skilled in the art would recognize that a number of techniques are available for approximating lighting effects in a rendered image, each of which may be used in embodiments of the disclosure.

At 308, the computer system renders an image of the object having a simulated lighting effect. For example, the rendered image may be an approximation (or simulation) of the real object, generated in response to receiving instructions from the system, and using the information determined for the actual light source at step 307 to create a real-time estimation (or simulation) of an effect that the light source would have on the object. For example, the system may render an image of the object as well as a highlight which is estimated to result from the light source (e.g., in the same position and with a similar intensity). In some embodiments a highlight depicted on the rendered image of an object may be an example of a simulated lighting effect.

At 310, the computer system may provide instructions to limit the range of potential visual material property values to consider. For example, the object may have properties that allow the visual material property values to be limited to a range of 0 to 10 units. In some embodiments, the computer system may receive an indication of a likely material for a particular section of the object. In these embodiments, the computer system may identify a range of visual material property values that are possible for the indicated material. In some embodiments, the computer system may employ a full range of visual material property values.

At 312, the computer system generates a grid of rendered images (e.g., a series of rendered images of the object 104), with each point in the grid representing a different combination of visual material property values assigned to the generated rendered image. For example, a set of visual material property values may be comprised of "metalness" and "roughness." Assuming there are ten increments of visual material property values assigned to both the metalness and roughness visual material properties, a 10×10 grid is created, each point in the grid associated with a generated rendered image. To generate each of the rendered images, the computer system may adjust the rendered image of the object generated at 308 by adjusting the effect that the light source is estimated (or determined) to have on the object in accordance with the respective visual material property values. For example, if a particular rendered image to be generated is associated with a metalness of 5 and a roughness of 3, then a highlight created using the identified lighting information at 308 may be adjusted so that it approximates (or simulates) what a highlight would look like on an object having a metalness of 5 and a roughness of 3. This is repeated for each of the fields in the grid.

At 314, the computer system provides instructions to compare each rendered image in the grid of rendered images with the captured images of the object. Comparison of a rendered image to an actual image may be performed in a number of ways. For example, the computer system may make a pixel-by-pixel comparison in which pixel values (e.g., red, green, and blue values) are compared for each corresponding pixel in the two images. A delta may then be calculated as a function of the difference in values identified at 316. Deltas may be calculated and stored in relation to each of the rendered images in the grid of rendered images, for example, in a grid of deltas. In some embodiments, the comparison may include only a portion of the image that includes a highlight on the section of the object.

In some embodiments, a delta may be calculated as an image error, (e.g., a measure of difference between the generated image and what the image should have looked like). Examples of calculating an image error from the generated image and captured image include using a mean square error or an absolute difference. One skilled in the art, after considering the teachings of this disclosure, would easily recognize a number of ways to calculate these error values.

At 318, the computer system provides instructions to identify the minimum image error in the grid. In some embodiments, each field of the grid is considered until the minimum error is identified. The computer system then determines which visual material property values are associated with that field. At 320, the computer system may assign the determined visual material property values associated with the lowest error to the section of the object upon which the process was performed.

At 322, the computer system may determine whether additional sections of the object need to be processed. If the computer system determines that additional sections do need to be processed, then the process may then be repeated to approximate (or simulate) visual material property values for each of those sections. If the computer system determines that no additional sections need to be processed, then the visual material property values may be stored by the computer system with respect to each individual section of the object.

At 324, the computer system may generate a 3D model. In generating the 3D model, the computer system may render each section of the object using the visual material properties determined above. It should be noted that each section of the object may be assigned different visual material property values. It should be noted that the identified visual material property values may be independent of other material properties. For example, the identified visual material property values are independent of the object's color or opacity.

In accordance with at least some embodiments, the process 300 may be performed by a computer system automatically (e.g., without human interaction). For example, a user may place an object on a staging platform 225 and provide various operational constraints for the 3D image to be captured via interface device 208. The computer system may then perform process 300 without requiring any further interaction from the user.

Figure 4:
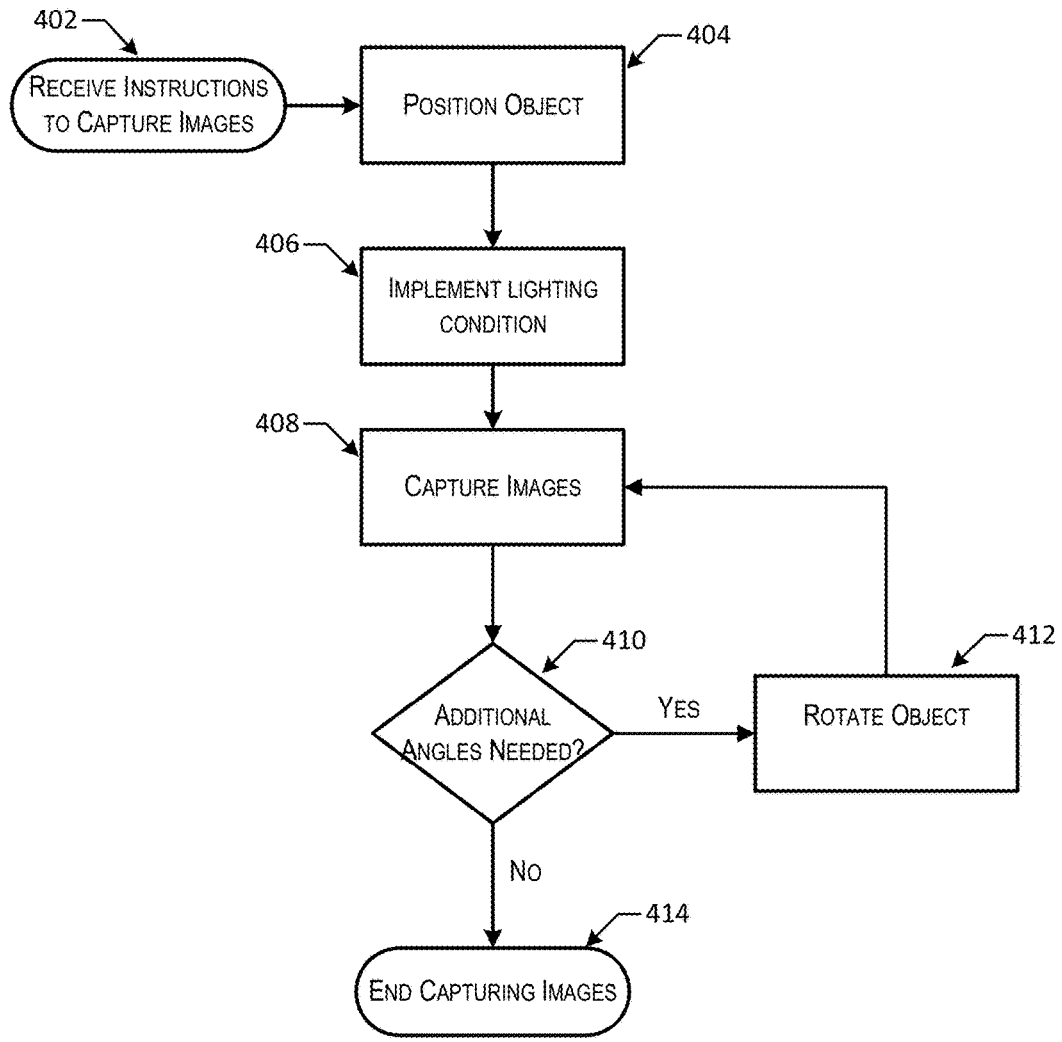
FIG. 4 depicts a flow chart illustrating a process for capturing images in generating a 3D model in accordance with at least some embodiments.

FIG. 4 depicts a flow diagram illustrating the capture of images of the object (e.g., the capture image step 304). In accordance with at least some embodiments, the process 400 may be implemented by a computer system (e.g., the system architecture as described in FIG. 2).

In some embodiments, process 400 may begin at 402, when the computer system receives instructions to capture images of an object. For example, a new object may require a full set of images captured in order to obtain the necessary information for the computer system to generate a 3D model. In some embodiments, the user may also provide operational constraints, such as the number of images to be captured and/or an amount of overlap between images. The computer system may identify an angle for each rotation of a staging platform based on the number of images. For example, the user may indicate that six sets of images should be obtained. In this example, the control unit may determine that the object should be repositioned in 60° increments. In other instances, the user may require additional images to capture additional detail of the object. For example, an array of six cameras and 15° increment repositioning results in at least 144 captured images of the object.

At 404, the computer system may position or reposition the object or cameras. For example, the control unit may cause one or more cameras to be repositioned. In addition, a pan or tilt of one or more cameras may be altered to shift a focus of that camera. In some embodiments, a level of magnification or zoom may be updated in order to change the field of view to the appropriate field of view for that camera. At 406, a lighting condition can be implemented by exposing the object 104 (and/or the staging object 106) to a source of light.

At 408, the computer system may cause cameras to capture image information associated with the object 104 (and/or the staging object 106). In some embodiments, the image information may include an array of images corresponding to an array of cameras by which the image information was captured. For example, in the captured image information, a number of images may be taken that each portray a different portion of the object 104 (and/or staging object 106) according to the determined field of view.

At 410, the computer system may determine whether the system needs to capture additional images. For example, the computer system may determine whether images have been captured from each relevant object position. If the system determines that additional images are still required, then the system may rotate the object and/or reposition the cameras relative to the object and return to step 304. In some embodiments, the system may capture a number of images at any angle of rotation. The angle of rotation and/or number of rotations may be specified in the received request. For example, the operational characteristics provided by the user in the request may include an indication that the object should be rotated 12° between each set of images. In this example, the process described above may be repeated a total of 30 times (for a full 360° of images). If the system determines that no additional images are necessary (e.g., that all of the required sets of images have been obtained), then the system may end the imaging process 400. In some embodiments, the system may generate a 3D model from the captured image sets.

At 412, the computer system may reposition the object. In some embodiments, the computer system may cause the object to be repositioned a number of times in order to capture a subsequent set of images. For example, the computer system may identify a number of different object orientations from which image information is to be captured. In this example, the computer system may, upon capturing the initial array of images, cause the object to be rotated, the fields of view associated with an array of cameras readjusted (e.g., using steps 404-408 described above), capture an additional array of images, and repeat this process until a full set of images has been obtained.

At 414, the computer system concludes obtaining image information. In some embodiments, the captured image information may be used to generate a texture map, which may be mapped onto a shell or other object model. In some embodiments, the images in the array of images may be aligned based on the overlapping pixels from each adjacent image in the array of images. In some embodiments, the images in the array of images may be saved to a database without further processing. The process 400 may be completed upon capturing all requisite images.

In accordance with at least some embodiments, one or more of the processes described herein (e.g., those for identifying material property values for a section of the object) may be performed with respect to each rotation of the object. For example, material property values may be approximated (or simulated) for each identified section of the object at each angle (e.g., after each rotation of the object). In some embodiments, an image difference may be calculated as a sum of all of the differences (or deltas) of each of the different angles.

Figure 5:
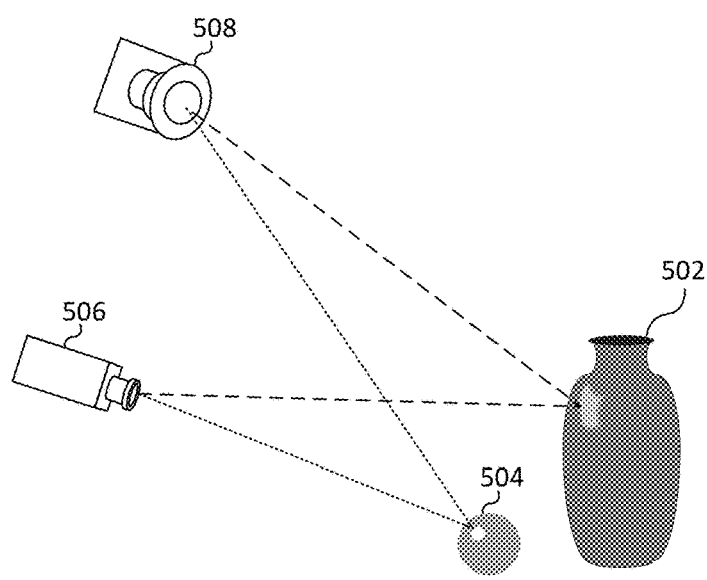
FIG. 5 depicts an illustrative example of information that may be used to generate a virtual light source in accordance with at least some embodiments.

FIG. 5 depicts an illustrative example of information that may be used to generate a virtual light source in accordance with at least some embodiments. In some embodiments, the use of a virtual light source as described as being generated with respect to FIG. 5 may be one method of generating a lighting effect as described herein. In FIG. 5, an object 502 may be placed within a scene (an area to be photographed). In some embodiments, a staging object 504 may also be placed within the scene. The staging object may be any object having a known geometry and/or specular value properties. For example, the staging object 504 may be a chrome (e.g., mirrored) ball having a minimum roughness value and a maximum metalness value. The staging object 504 may be placed in any position relative to the object 502, though it may be placed in such a way that it does not block capture of an image of the object 502.

In some embodiments, a camera 506 and/or a light source 506 may have a known position with respect to the 3D imaging system. Some embodiments, may include a depth sensor which is capable of detecting distance information for the staging object 504 and generating a range map. The range map may be used to determine a geometry of the staging object 504. In some embodiments, an image that includes the staging object 504 may be used to locate a highlight on the staging object 504. The location of the highlight on the staging object 504 may then be compared to the geometry of the staging object 504 at the location of the identified highlight. In some embodiments, the system may determine an angle of the light source with respect to the staging object 504 and the camera 506.

Once the system has determined the geometry of the staging object 504 at the location of the identified highlight, the system may identify a location of a similar geometry on the object 502 (e.g., using depth information). In some embodiments, the system may offset the location based on the determined angle to compensate for a difference in size and/or location. A virtual light source may then be generated to approximate the light source 508 by generating a highlight to be depicted in a rendered image on the object 502 at the determined location.

Figure 6:
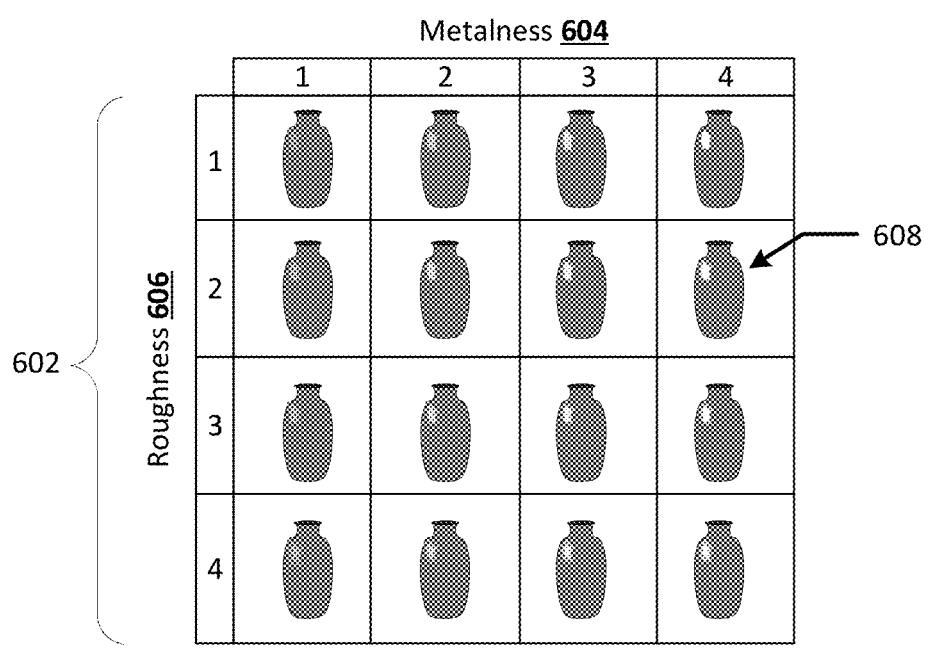

FIG. 6 depicts an illustrative example of a grid of rendered images that may be generated in accordance with at least some embodiments. In FIG. 6, a grid 602 of rendered images may be constructed with respect to a number of visual material properties, where each dimension of the grid is associated with a visual material property (e.g., 604 and 606). Although depicted in FIG. 6 as having two dimensions, the grid may have any number of dimensions, each representing a different visual material property. For example, in FIG. 6, the columns are depicted as representing a metalness visual material property value whereas the rows are depicted as representing a roughness visual material property value. The visual material property values may be represented in any suitable increments.

The visual material property values of the grid 602 may be bounded by any appropriate range of values. In some embodiments, the range of values may be determined based upon a type of material that the 3D imaging system has determined it is likely that a particular section of the object is made of. For example, the 3D imaging system may determine a likely material for a section of the object based on its color or other properties. In some embodiments, the 3D imaging system may receive a range of values for a particular visual material property from a user via an interface.

In accordance with at least some embodiments, the 3D imaging system may generate a number of rendered images for each set of grid coordinates in the grid of rendered images. Each image may consist of a 3D render of an object as well as highlight that approximates (or simulates) what a highlight would look like with the visual material property values of a grid location by simulating a lighting effect. By way of illustration, the rendered image 608 generated for grid coordinates (2, 4) may approximate (or simulate) what the object would look like having a roughness value of 2 and a metalness value of 4.

Figure 7:
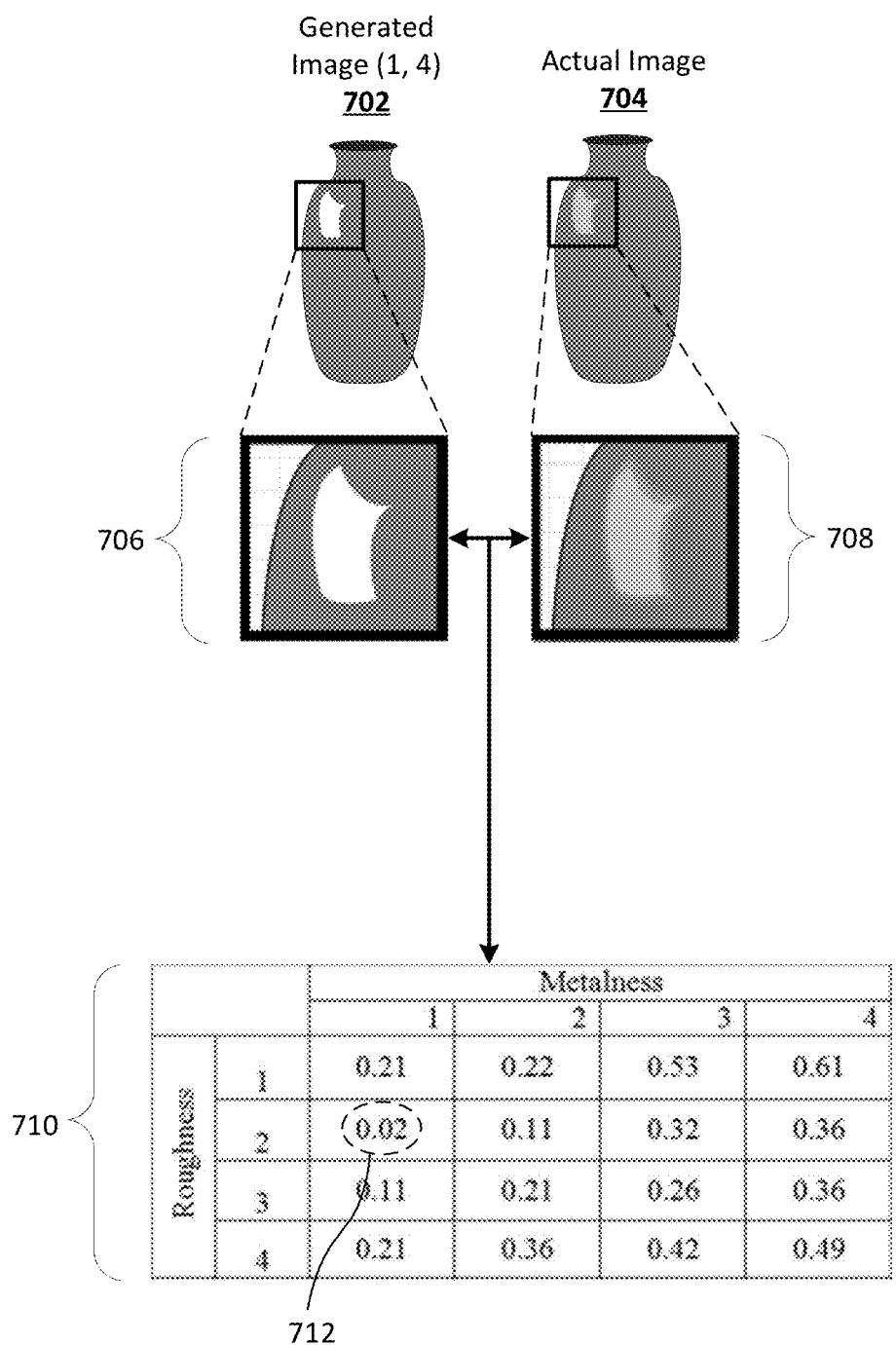
FIG. 7 depicts an illustrative example of a process for comparing rendered images to an actual image and approximating (or simulating) visual material property values based on that comparison in accordance with at least some embodiments.

FIG. 7 depicts an illustrative example of a process for comparing rendered images to an actual image and approximating (or simulating) visual material property values based on that comparison in accordance with at least some embodiments. In accordance with at least some embodiments, each generated rendered image 702 in a grid of rendered images (e.g., the grid 602 depicted in FIG. 6) may be compared to an actual image 704 in order to approximate (or simulate) the visual material property values of the object depicted.

In some embodiments, the 3D imaging system may identify a subsection 706 of the rendered image that includes a highlight on the object. The subsection 706 may then be compared to a corresponding subsection 708 of the actual image. In particular, pixel values in the subsection 706 may be compared to pixel values in a corresponding location within the subsection 708. The differences in pixel values between the generated rendered image 706 and the pixel values in the actual image 708 may be expressed as a delta. The delta may be calculated as a function of the pixel values (or differences in pixel values). The delta may be stored in association with the generated rendered image 706, such that each rendered image is associated with a delta.

Once deltas have been calculated for each of the rendered images in a grid of rendered images, the system may identify a lowest, or minimum, delta of those calculated. Once identified, the system determines the visual material property values of the rendered image associated with the lowest identified delta. In some embodiments, a new grid of rendered images may be generated based on the visual material property values associated with the lowest delta. The specular values may then be refined by repeating the process described herein.

Figure 8:
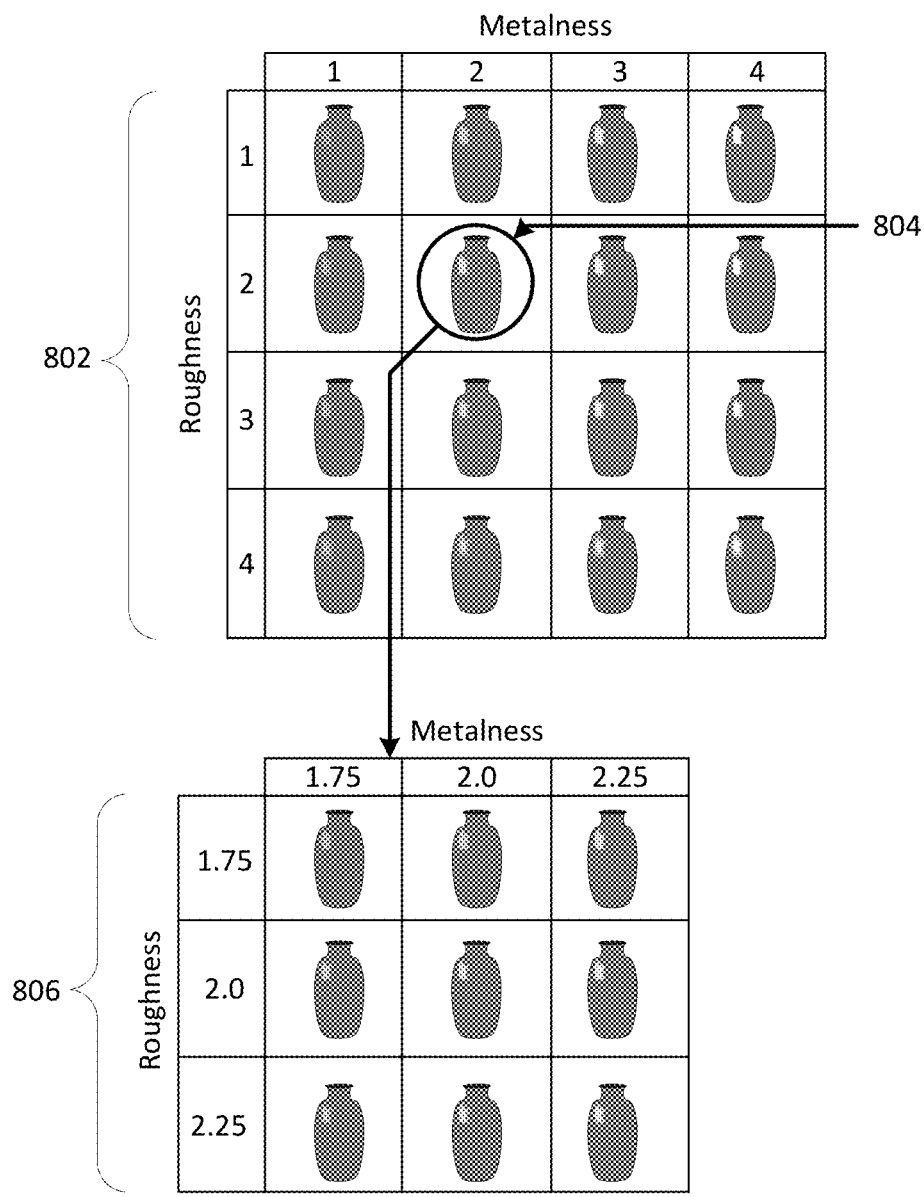
FIG. 8 depicts an illustrative example of a process for refining visual material property values by adjusting a range of visual material property values and generating a new grid using the adjusted range of visual material property values in accordance with at least some embodiments.

FIG. 8 depicts an illustrative example of a process for refining visual material property values by adjusting a range of visual material property values and generating a new grid using the adjusted range of visual material property values in accordance with at least some embodiments. In FIG. 8, a process is performed to identify a rendered image having a lowest delta within a grid of rendered images. As described elsewhere, the object, or section of the object, may be assigned a set of approximate (or simulative) visual material property values. After approximating (or simulating) these values, the system may adjust the range of values for visual material properties based on the approximated (or simulated) values. In some embodiments, the range of values may be adjusted so that they narrow in on the approximated (or simulated) values. For example, the range of values for the newly generated grid may be set so that they are bounded by values above and below those associated with the lowest delta.

In accordance with at least some embodiments, the range of values may be determined based on an amount of the lowest identified delta. In some embodiments, a minimum and maximum values in the range of values may be selected so that they vary from the approximated (or simulated) visual material property values by an amount that is proportional to an amount of the delta value. For example, the minimum and maximum values in the range of values may be selected so that the distance from the approximated (or simulated) visual material property values is proportional to an amount of the delta value. In some embodiments, the refinement process depicted in FIG. 8 may be repeated a number of times to better approximate (or simulate) the visual material property values of the object or at least a section of the object.

Figure 9:
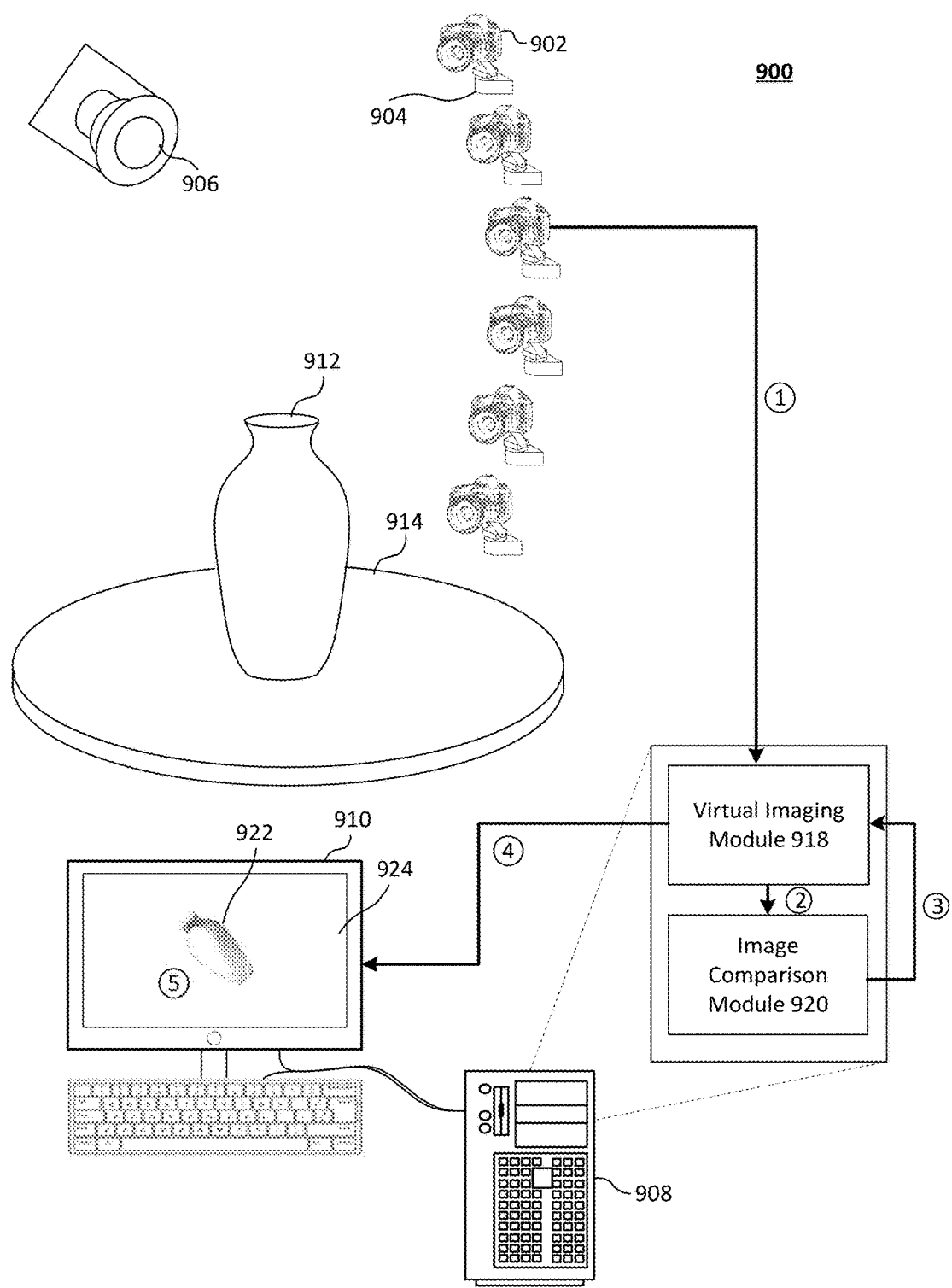
FIG. 9 depicts one potential implementation of the system described in accordance with at least some embodiments.

FIG. 9 depicts one potential implementation of the system described in accordance with at least some embodiments. The implementation depicted in FIG. 9 is provided for illustrative purposes and is not intended to be limiting.

In FIG. 9 is depicted an array of cameras 902, each of which is mounted on a robotic pan/tilt platform 904. In this particular implementation, an example of suitable cameras 902 may include a number of Canon EOS 5DS R cameras which each have a 50.6 Megapixel sensor and the low-pass filter (LPF) effect cancelled in order to provide greater fine-edge sharpness and detail. Additionally, suitable robotic pan/tilt platforms 904 may include any device upon which a camera 902 may be mounted which is capable of achieving a specified position of the camera.

The robotic pan/tilt platforms 904 may have a number of servomotors or other actuators capable of positioning each camera 902 to a particular pan/tilt (e.g., by rotating the camera 902 along a horizontal or vertical axis).

Each of the cameras 902 and robotic pan/tilt platforms 904 are depicted as being coupled with a control unit 908. Control unit 908 may be any suitable computing device capable of performing the functions described herein and may be an example control unit 202 as depicted in FIG. 2. As described above, the control unit 908 is in communication with an interface device 910, which may be an example interface device 208 as depicted in FIG. 2.

Additionally depicted is an object 912 (a vase in this example) staged on an object positioning platform 914. The object positioning platform 914 may be a turntable capable of rotating the object around a vertical axis and may be an example object positioning platform 225 as depicted in FIG. 2. The object positioning platform 914 may also be in communication with the control unit 908, which may provide instructions to the object positioning platform 914 to cause it to reposition the vase 912. The positioning platform 914, and the object 912 positioned upon the positioning platform 914, may be illuminated by a light source 906. In some embodiments, the light source 906 may be consist of a single source of light in order to control lighting conditions.

In the depicted implementation, the control unit 908 may include a number of applications configured to interact (e.g., via application programming interfaces (APIs)) to generate a 3D model of the vase 912. In particular, the control unit 908 may include at least a virtual imaging module 918 and an image comparison module 920. The virtual imaging module 918 and image comparison module 920 may be an example a virtual imaging module 218 and an image comparison module 226 of FIG. 2, which are described in greater detail elsewhere.

The virtual imaging module 918 may be any application or combination of applications capable of generating a 3D model representation 922 from image information captured in accordance with embodiments of the disclosure. Some suitable virtual imaging modules 918 may include a photogrammetry software used in combination with rendering software. For example, the system may utilize AGISOFT PHOTOSCAN photogrammetry software application or CAPTURINGREALITY photogrammetry software application, both of which are capable of performing photogrammetric processing of digital images and generating 3D spatial data (e.g., 3D models). Additionally, the 3D models generated using the photogrammetry software may be rendered using a 3D rendering software application. Some examples of a 3D rendering software application may include game engines such as UNITY.

The exemplary system depicted in FIG. 9 is capable of capturing images of an object 912 and generating an accurate 3D model representation 922 of that object. At step 1 of a process in which a 3D model representation 922 is generated from an object 912, images of the object 912 are captured by the cameras 902 (e.g., the Canon EOS 5DS R cameras 902 in the array of cameras). The images may be captured from a number of different angles in order to obtain a complete view of the object 912. These images may then be combined by the virtual imaging module 918 in order to generate a basic 3D model of the object (e.g., one without assigned visual material property values). The virtual imaging module 918 then generates a series of rendered images of the vase 912. The number of rendered images generated depends on the range and increments of the visual material properties to be assigned. For example, the visual material properties considered may be metalness and roughness. Each metalness and roughness may consist of a range from 0 to 9, resulting in 100 generated rendered images using an increment size of one (10×10). In some embodiments, the range may be pre-defined by a user as an operational constraint. For example, the user may enter visual material property values corresponding to a typical vase, or one similar to the vase 912 in which the visual material property values may be defined to include a metalness range of 0 to 4 and a roughness range from 6 to 10. In this example, if the virtual imaging module 918 uses an increment of one, 25 rendered images would be generated.

At step 2, the image comparison module 920 calculates the image error (or delta) for each rendered image in the grid. The image error is calculated by comparing each rendered image of the vase with the captured images of the vase. The image error may be calculated as a mean square error or as an absolute difference. Once each image error is calculated, the minimum image error is identified and selected. For example, it may be found that a visual material property value set of {1, 2} corresponds to the minimum image error. The rendered image with 1 metalness and 2 roughness will be identified as the best approximation (or simulation) of the actual image.

In some embodiments, this process may be repeated a number of times at step 3 in order to refine the visual material property values. For example, once a best approximation (or simulation) of the visual material property values has been identified from the current grid of rendered images, the virtual imaging module 918 may generate a second grid of rendered images that includes a narrower range of values as well as smaller increments. The visual material property values identified upon selection of the lowest image error from this grid will likely be more accurate than those first approximated (or simulated). This may be repeated a number of times to improve the accuracy of the approximation (or simulation). In some embodiments, the steps may be repeated a predetermined number of times. In some embodiments, the steps may be repeated until an image error is below a predetermined threshold value. At step 4, a final 3D model 922 may be generated by the virtual imaging module 918 using these visual material property values. The 3D model 922 may be presented on a display device 924 at step 5.

Embodiments of the disclosure provide for a number of technical advantages over conventional 3D imaging systems. For example, a number of conventional systems are configured to identify visual material property values by generating, comparing, and adjusting images until an image error stops decreasing and begins to increase. For example, a methodology may iterate through multiple visual material properties until a low image error is found. Once a low image error is found, the iteration ends and that rendered image is selected as the most accurate representation of the actual object. However, this may not be true—there may be a different visual material property set with a more accurate representation. The current system avoids these issues by generating rendered images for a wider range of visual material property values.

Additionally, rendering 3D models using the current system has technical advantages over other 3D imaging systems. For example, a number of conventional 3D imaging systems attempt to identify a material or materials from which an object is made using visual material property values. Once identified, the system may assign that property to the object, so that the object will be rendered using visual material properties from a material library. However, the current system renders objects independent of any material identification. This ensures that the results are accurate despite potential differences in visual material property values for a material. For example, a conventional 3D imaging system may determine that an object has visual material property values associated with brushed steel. In future renders of the object, the 3D imaging system may render the object using the brushed steel from its material library. However, it should be noted that brushed steel can have a range of roughness, such that one brushed steel object may have different visual material properties than another brushed steel object. Accordingly, maintaining particular visual material property values independent of any material may provide a more accurate render for a 3D object.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of generating a three-dimensional (3D) model, comprising:
   receiving, by a computer system, a captured image of an object using a light source;
   identifying, by the computer system, a first section of the object based on the captured image;
   determining one or more properties of the light source;
   for at least the first section of the object, performing operations that comprise:
      generating, using the determined one or more properties of the light source, a grid of rendered images having two or more dimensions, each of the multiple dimensions associated with different material properties, with each rendered image having a set of specified visual material property values according to a position of the rendered image within the grid of rendered images, such that each rendered image is rendered with a lighting effect that approximates or simulates an effect of the light source on an appearance of the object with the specified visual material property values;
      comparing each of the individual rendered images of the grid of rendered images to the captured image;
      calculating an image error based on the comparison between each individual rendered image and the captured image; and
      assigning a visual material property value associated with the individual rendered image to the section based upon the image error.

2. The method of claim 1, wherein the operations are repeated for at least a second section.

3. The method of claim 1, wherein the visual material property values include at least one of metalness or roughness.

4. The method of claim 1, wherein the visual material property values are selected to be within a pre-defined range.

5. The method of claim 4, wherein the pre-defined range selection is at least based on a material from which the first section of the object is determined to be made.

6. The method of claim 1, further comprising selecting the individual rendered image of the grid of rendered images associated with the lowest image error, wherein the visual material property values assigned to the first section corresponds to the specified visual material property values associated with the position within the grid of rendered images of the selected individual rendered image.

7. The method of claim 1, wherein the grid of rendered images comprises rows representing a first visual material property and columns representing a second visual material property, such that the specified visual material property values represent a specific combination of a first visual material property value and a second material property value.

8. A 3D imaging system comprising:
one or more camera devices;
a processor; and
a memory including instructions that, when executed with the processor, cause the system to, at least:
determine one or more properties of a light source;
receive one or more captured images of an object illuminated by the light source;
identify a first section of the object based on the one or more captured images;
generate, using the determined one or more properties of the light source, a grid of rendered images having multiple dimensions, each of the multiple dimensions associated with different material properties, with each rendered image having a lighting effect rendered based on a set of specified visual material property values according to a position of the rendered image within the grid such that the lighting effect approximates or simulates an effect of the light source;
compare at least one rendered image in the grid to the one or more captured images;
calculate, based on the comparison between each rendered image in the grid and the one or more captured images, an image error;
identify a rendered image of the grid of rendered images associated with a minimum image error; and
assign at least one visual material property value associated with the identified rendered image to the first section.

9. The 3D imaging system of claim 8, wherein the memory further includes instructions that, when executed with the processor, cause the system to, at least:
generate a related 3D model based on the at least one visual material property value assigned to the first section.

10. The 3D imaging system of claim 8, wherein the visual material property values include at least one of metalness or roughness.

11. The 3D imaging system of claim 8, wherein the calculation of an image error comprises a calculation of a mean square error or absolute difference in pixel values between the at least one rendered image in the grid and the one or more captured images.

12. The 3D imaging system of claim 11, wherein the instructions, when executed with the processor, further cause the system to utilize High Dynamic Range Imaging techniques.

13. The 3D imaging system of claim 8, wherein the visual material property values are selected to be within a pre-defined range and wherein selection of the pre-defined range is based on a type of material determined to be present within the first section of the object.

14. The 3D imaging system of claim 8, wherein the memory further includes instructions that, when executed with the processor, cause the system to, at least:
identify a second section of the object based on the one or more captured images;
generate, using the determined one or more properties of the light source, a second grid of rendered images having multiple dimensions, each of the multiple dimensions of the second grid being associated with different material properties with each rendered image of the second grid having a lighting effect rendered based on a set of specified visual material property values according to a position of the rendered image within the second grid such that the lighting effect approximates or simulates an effect of the light source;
compare at least one rendered image in the second grid to the one or more captured images;
calculate, based on the comparison between each rendered image in the second grid and the one or more captured images, an image error;
identify a rendered image of the second grid of rendered images associated with a minimum image error; and
assign at least one visual material property value associated with the identified rendered image to the second section.

15. A 3D imaging apparatus comprising:
one or more optical sensors configured to capture an image of an object;
a light source; and
a control unit communicatively coupled to the one or more optical sensors, the control unit configured to:
receive one or more captured images of an object illuminated by the light source;
identify a first section of the object based on the one or more captured images;
determine a set of properties of the light source;
generate a grid of rendered images having multiple dimensions, each of the multiple dimensions associated with different material properties, with each rendered image having a lighting effect rendered based on a set of specified visual material property values according to a position within the grid such that the lighting effect approximates or simulates an effect of the light source on an appearance of the object;
compare at least one rendered image in the grid to the one or more captured images;
calculate, based on the comparison between each rendered image in the grid and the one or more captured images, an image error;
identify a rendered image of the grid of rendered images associated with an image error determined to be lower than other image errors; and
assign at least one visual material property value associated with the identified rendered image to the first section.

16. The 3D imaging apparatus of claim 15, wherein a light source comprises a single source of light.

17. The 3D imaging apparatus of claim 16, wherein determining a set of properties of the light source comprises identifying a position of a highlight on a staging object and estimating an approximate or exact position of the light source from the position of the highlight.

18. The 3D imaging apparatus of claim 15, wherein the 3D imaging apparatus is configured to cause a staging device to rotate the object by a determined number of degrees.

19. The 3D imaging apparatus of claim 18, wherein the number of degrees is determined based on a number of rotations indicated in operational constraints received from a user.

20. The 3D imaging apparatus of claim 15, wherein the control unit is further configured to receive operational constraints from a user that specify the number of images to be captured of the object.

21. The 3D imaging apparatus of claim 15, wherein the image error is calculated as an absolute difference in pixel values between the at least one rendered image in the grid and the one or more captured images.

22. The 3D imaging apparatus of claim 15, wherein the image error is calculated by a mean square error in pixel values between the at least one rendered image in the grid and the one or more captured images.

* * * * *